US007826380B2

(12) United States Patent
Ash et al.

(10) Patent No.: US 7,826,380 B2
(45) Date of Patent: Nov. 2, 2010

(54) APPARATUS, SYSTEM, AND METHOD FOR DATA TRACKING (75) Inventors: Kevin John Ash, Tucson, AZ (US); Susan Kay Candelaria, Tucson, AZ (US); David Frank Mannenbach, Tucson, AZ (US); Brian Anthony Rinaldi, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1126 days.

(21) Appl. No.: 11/093,393

(22) Filed: Mar. 30, 2005

(65) Prior Publication Data
US 2006/0227702 A1 Oct. 12, 2006

(51) Int. Cl.
*G01R 31/08* (2006.01)

(52) U.S. Cl. .......................................... 370/242; 714/25
(58) Field of Classification Search ................ None
See application file for complete search history.

(56) References Cited

U.S. PATENT DOCUMENTS 5,511,164 A * 4/1996 Brunmeier et al. ........... 714/53
5,937,201 A * 8/1999 Matsushita et al. .......... 713/310
6,260,120 B1 * 7/2001 Blumenau et al. ........... 711/152
6,397,349 B2 * 5/2002 Higgins et al. ................ 714/7
6,671,776 B1 * 12/2003 DeKoning ................... 711/114
7,020,089 B2 * 3/2006 Matsuda ..................... 370/242
7,574,602 B2 * 8/2009 Isozaki et al. ............... 713/168
2005/0182862 A1 * 8/2005 Ritz et al. ..................... 710/22
2005/0238006 A1 * 10/2005 Taylor et al. ................ 370/389

* cited by examiner

*Primary Examiner*—Kevin C Harper
*Assistant Examiner*—Rhonda Murphy
(74) *Attorney, Agent, or Firm*—Kunzler Needham Massey & Thorpe (57) ABSTRACT An apparatus, system, and method are disclosed for data tracking and, in particular, for facilitating failure management within an electronic data communication system. The apparatus includes a tracking module and an error analysis module. The tracking module stores an adapter identifier in a tracking array. The adapter identifier corresponds to a source adapter from which data is received. The error analysis module determines a source of a data failure in response to recognition of the data failure. The data failure may occur on a host adapter, a device adapter, a communication fabric, a multi-processor, or another communication device. The apparatus, system, and method may be implemented in place of or in addition to hardware-assisted data integrity checking within a data storage system.

18 Claims, 8 Drawing Sheets

APPARATUS, SYSTEM, AND METHOD FOR DATA TRACKING

BACKGROUND OF THE INVENTION

1. Field of the Invention

This invention relates to data tracking and more particularly relates to tracking a source of data for failure management.

2. Description of the Related Art

Data communications occur at various levels within contemporary computing systems. For example, data communications occur in standalone computer system, in storage devices, in networks, and over the internet. Furthermore, data communications are facilitated by a variety of communication media, including wired and wireless communication channels.

Data storage within a data storage system allows a host to store data on individual or shared data storage devices. Such a data storage system may be implemented through a variety of networking technologies, such as a local area network (LAN) coupled to a storage area network (SAN). Use of a SAN allows multiple users to share access to a logically centralized data storage system.

In order to efficiently communicate data among a variety of hosts and users, a data communication system may use intermediate communication devices, such as switches and routers. Data communication systems also may employ servers that facilitate data storage operations to and from the various hosts. Data communication systems also may perform error checking on the communicated data in order to ensure the integrity of the data as it is transferred within the data communication system.

Certain conventional error checking operations are implemented through error checking hardware. This type of error checking may be referred to as hardware-assisted error checking because the error checking technology is built into the logic of the hardware. Hardware-assisted error checking typically provides real-time error checking as data is transferred from one device to another. However, hardware-assisted error checking is subject to errors because the error checking hardware might fail.

Hardware-assisted error checking is also limited by the ability to design and implement error checking hardware within a data communication system. Often, such error checking hardware is customized for a particular system and cannot be used interchangeable with off-the-shelf computer components. With the prevalence and potential cost advantages of off-the-shelf components, the ability to integrate custom error checking hardware into a data communication system may be limited.

For example, in a data communication system in which data is communicated from a host to a disk, the data may pass through several components. For instance, the data may pass through a source adapter, such as a host adapter, to a processor and then to a disk adapter so that the data ultimately may be stored on the disk. If one or more of these components does not have error checking hardware because it is not a customized component or for another reason, conventional hardware-assisted error checking may fail to recognize a data failure. Alternatively, the hardware-assisted error checking may fail to indicate the source of the data failure.

From the foregoing discussion, it should be apparent that a need exists for an apparatus, system, and method that overcome the limitations of conventional hardware-assisted error checking. Beneficially, such an apparatus, system, and method would provide error checking capabilities where error checking hardware is potentially lacking.

SUMMARY OF THE INVENTION

The several embodiments of the present invention have been developed in response to the present state of the art, and in particular, in response to the problems and needs in the art that have not yet been fully solved by currently available data failure management. Accordingly, the present invention has been developed to provide an apparatus, system, and method for data failure management that overcome many or all of the above-discussed shortcomings in the art. In particular, embodiments of this invention facilitate failure management in the absence of hardware assisted error checking.

The apparatus to facilitate failure management is provided with a logic unit containing a plurality of modules configured to functionally execute the necessary operations for data failure management. These modules in the described embodiments include a tracking module, an error analysis module, an array module, an initialization module, a failover module, and a notification module. Other embodiments of the tracking apparatus may include fewer or more modules.

In one embodiment, the tracking module stores an adapter identifier in a tracking array. The adapter identifier corresponds to a source adapter from which data is received. In one embodiment, a host adapter may be a source adapter. Alternatively, a disk adapter may be a source adapter. In another embodiment, the tracking module stores adapter identifiers for all the source adapters that transfer data via a multiprocessor.

The tracking module also may store historical data for data transfers. For example, the tracking module may store adapter identifiers for source adapters involved in past data transfers, other than the most recent data transfer. Where multiple adapter identifiers are tracked for a single data segment, for example, the tracking module may store the adapter identifiers in the tracking array. Furthermore, the tracking module may move an adapter identifier corresponding to a previous data transfer from one field in the array to another in order to store the adapter identifier corresponding to the most recent data transfer in a particular field of the tracking array.

In one embodiment, the error analysis module determines a source of a data failure, if any. The source of a data failure may be a host adapter, a disk adapter, a communication fabric, a microprocessor, or another component within a data communication system.

In one embodiment, the array module creates, or allocates, a tracking array for a granular portion of a track. The tracking array may correspond to the entire track, a segment, a sector, or another portion of the track. The array module additionally may create a tracking array for every portion of every track of a disk. In another embodiment, the array module may append a tracking array to a control block for a given disk, track, or portion of a track.

In one embodiment, the initialization module initializes a tracking array to an initialization instance. The initialization instance may be a valid instance type or an invalid instance type.

In one embodiment, the failover module fails over from a failed system component to another system component in response to recognition of a failure. In one embodiment, the failover module may fail over from one system component to another in response to a determination by the error analysis module that a failure has occurred. The failover module may failover from one adapter to another, from one communication fabric to another, from one storage server to another, or at another level within the data communication system.

In one embodiment, the notification module notifies a user or system administrator of a failure within the data communication system. Additionally, the notification module may notify a user or system administrator of a failover event and/or failover device.

A system of the present invention is also presented to facilitate failure management. The system may be embodied in a data communication system. The data communication system may include a data communication adapter, a multi-processor, a cache, and a tracking apparatus. The data communication adapter receives data from another system component and communicates the data to the multi-processor. The multi-processor receives the data, as well as associated metadata, from the data communication adapter. In one embodiment, the metadata includes an adapter identifier corresponding to the data communication adapter. The tracking apparatus may be substantially similar to the tracking apparatus described above.

In another embodiment, the system is configured to determine a source of a data failure in response to recognition of the data failure. In another embodiment, the data communication adapter is either a host adapter or a disk adapter.

A signal bearing medium is also presented to store a program that, when executed, performs operations to facilitate failure management. In one embodiment, the operations include storing an adapter identifier in a tracking array and determining a source of a data failure in response to recognition of the data failure. In one embodiment, the adapter identifier corresponds to a source adapter from which data is received.

In another embodiment, the operations may include creating a plurality of tracking arrays, including the tracking array, each of the plurality of tracking arrays corresponding to one of a plurality of electronic data storage devices. In another embodiment, the operations may include initializing each of the plurality of tracking arrays upon creation to an initialization instance. In another embodiment, the operations may include failing over to a failover device in response to recognition of a system device failure. In another embodiment, the operations may include notifying a system administrator of a system failure in response to recognition of the system failure.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
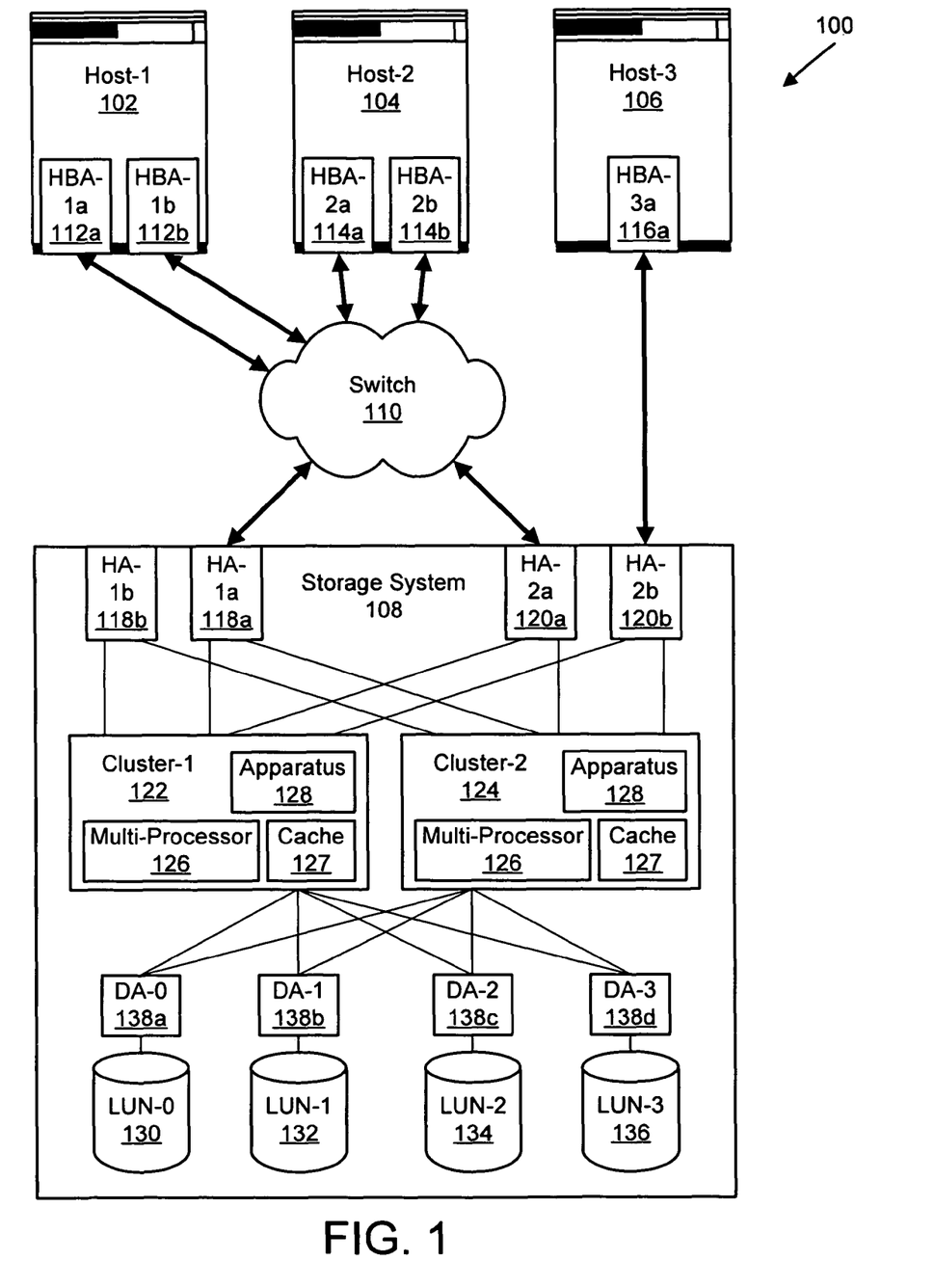
FIG. 1 is a schematic block diagram illustrating one embodiment of a data communication system.

FIG. 1 depicts one embodiment of a data communication system 100. The illustrated communication system 100 includes three hosts 102, 104, 106 connected to a storage system 108. The storage system 108, in one embodiment, is a storage server configured to store data. The first and second hosts 102, 104 are redundantly connected to the storage system 108 via a switch 110. The third host 106 is directly connected to the storage system 108. Other potential connectivity equipment is omitted for clarity.

Although three hosts 102, 104, 106 are shown in the depicted embodiment, the communication system 100 may operate with fewer or more hosts 102, 104, 106 and storage systems 108. Additionally, the hosts 102, 104, 106 may be connected to the storage system 108 in alternate configurations of varying redundancy and directness. Furthermore, the illustrated cabling connections may comprise Fibre Channel, Enterprise System Connection® (ESCON), Fiber Connection (FICON) channel, Small Computer System Interface (SCSI), and the like. Additionally, the communication system 100 may be configured to support various topologies, including Point-to-Point, Fabric Switched, Fibre Channel Arbitrated Loop (FC-AL), and so forth. Furthermore, the communication system 100 may support various Upper Level Protocols (ULPs), including Fibre Channel Protocol (FCP) and FICON (FC-SB-2).

Each of the depicted hosts 102, 104, 106 includes one or more host bus adapters (HBAs) 112, 114, 116. Each HBA 112, 114, 116 is configured to manage most of the I/O operations required to transfer data between the corresponding host 102, 104, 106 and the storage system 108. In particular, each host bus adapter 112, 114, 116 is optimized to perform many I/O operations very rapidly with little or no involvement by the host 102, 104, 106, minimizing the workload on the host 102, 104, 106. The host bus adapters 112, 114, 116 also may be referred to as communication adapters.

The depicted storage system 108 includes multiple, redundant host adapters 118, 120 and clusters 122, 124. The host adapters 118, 120 are substantially similar to the host bus adapters 112, 114, 116, described above, and also may be referred to as communication adapters. The clusters 122, 124 may be connected to the host adapters 118, 120 via one or more communication fabrics. Each cluster 122, 124 may include one or more multi-processors 126, caches 127, and tracking apparatuses 128. One example of a tracking apparatus 128 is shown and described in more detail with reference to FIG. 2. One example of a cache 127 is shown and described in more detail with reference to FIG. 4.

The clusters 122, 124 also may include connections to several logical unit numbers (LUNs) 130, 132, 134, 136. These connections may include one or more communication fabrics. In a particular embodiment, one cluster 122 may primarily access the even LUNs 130, 134, while the other cluster 124 may primarily access the odd LUNs 132, 136. The redundant paths between host adapters 118, 120 and clusters 122, 124 and between multi-processors 126, 128 and LUNs 130, 132, 134, 136 allows for data storage and access in the case of a failure, such as a hardware failure.

In the depicted embodiment, the clusters 122, 124 are connected to the LUNS 130, 132, 134, 136 via a plurality of disk adapters (DAs) 138. The disk adapters 138 also may be referred to as communication adapters. Additionally, the storage system 108 may employ a redundant array of independent disks (RAID) array, possibly mirroring and striping the stored data, as well as calculating and storing parity data.

Any reference to one of the illustrated hosts 102, 104, 106 is understood to refer to any or all of the hosts 102, 104, 106 unless explicitly noted otherwise. Likewise, any reference to one of the depicted host bus adapters 112, 114, 116 is understood to refer to any one or all of the communication adapters, including the host bus adapters 112, 114, 116 and/or the host adapters 118, 120 unless explicitly noted otherwise. Similarly, reference to one of the redundantly illustrated clusters 122, 124, multi-processors 126, caches 127, tracking apparatuses 128, disk adapters 138, or LUNs 130, 132, 134, 136 is understood to refer to any of the corresponding devices, respectively, unless explicitly stated otherwise.

Figure 2:
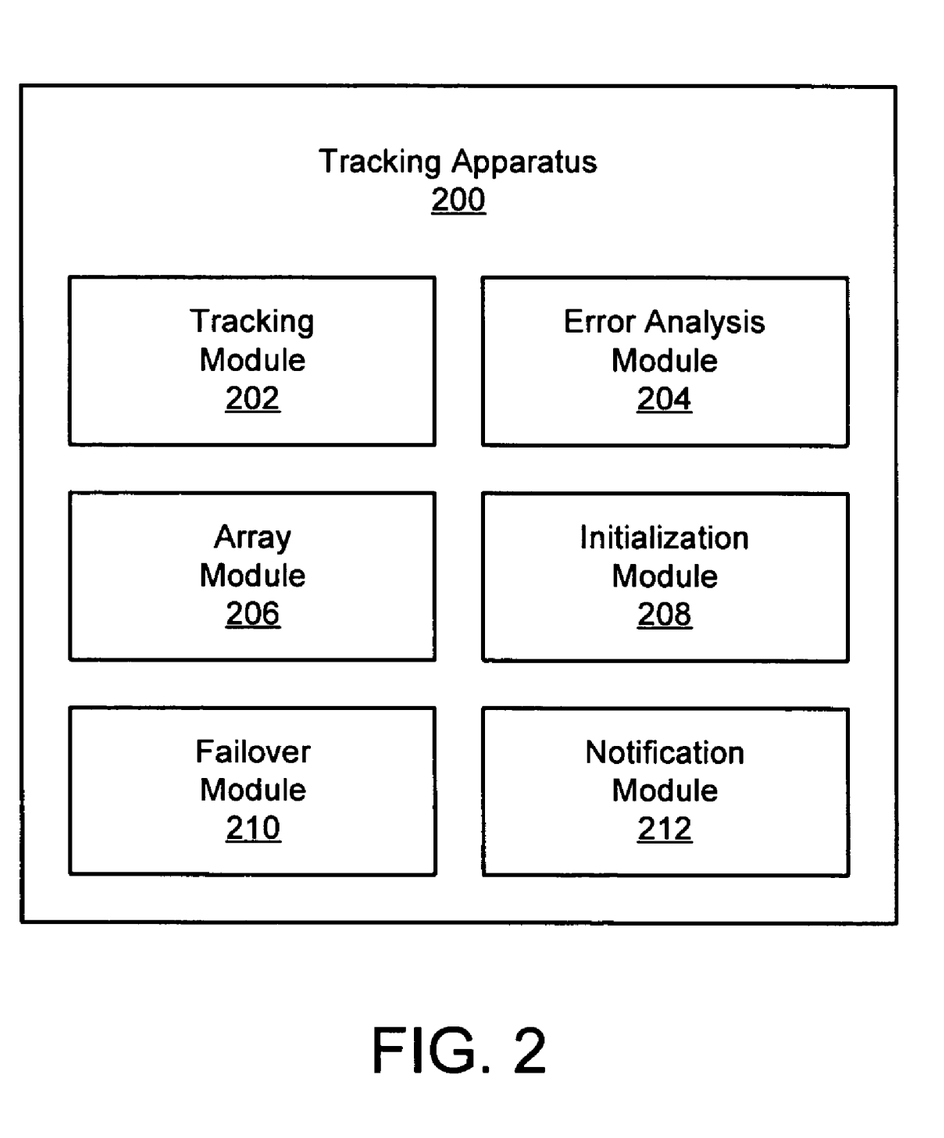
FIG. 2 is a schematic block diagram illustrating one embodiment of a tracking apparatus.

FIG. 2 depicts one embodiment of a tracking apparatus 200 that is substantially similar to the tracking apparatus 128 shown in FIG. 1. The illustrated tracking apparatus 200 includes a tracking module 202, an error analysis module 204, an array module 206, an initialization module 208, a failover module 210, and a notification module 212. Other embodiments of the tracking apparatus 200 may include fewer or more modules than are shown in FIG. 2.

In one embodiment, the tracking module 202 stores an adapter identifier in a tracking array. The adapter identifier corresponds to a source adapter from which data is received. In one embodiment, a host adapter 118 may be a source adapter where data is transferred from a host 102 to a LUN 130 (e.g., a write operation). Alternatively, a disk adapter 138 may be a source adapter where data is transferred from a LUN 130 to a host 102 (e.g., a read operation). In another embodiment, the tracking module 202 stores adapter identifiers for all the source adapters that transfer data via a multi-processor 126.

The tracking module 202 also may store historical data for data transfers. For example, the tracking module 202 may store adapter identifiers for source adapters involved in past data transfers, other than the most recent data transfer. Where multiple adapter identifiers are tracked for a single data segment, for example, the tracking module 202 may store the adapter identifiers in the tracking array. Furthermore, the tracking module 202 may move an adapter identifier corresponding to a previous data transfer from one field in the array to another in order to store the adapter identifier corresponding to the most recent data transfer in a particular field of the tracking array.

Additionally, a modification to a track may be a partial update or a full update. For example, a single segment or a single sector on a track may be updated independently of the other segments and sectors. Therefore, the tracking module 202 may track adapter identifiers associated with either partial or full updates, depending on a level of granularity determined by a user or administrator. By tracking updates in a granular manner and by tracking adapter identifiers for one or more previous data transfers, the tracking module facilitates failure management to determine which adapter or communication fabric or other component, if any, might by damaged or have failed.

In one embodiment, the tracking module 202 tracks modifications of data segments rather than data sectors in order to limit the size of the tracking array. Alternatively, the tracking module 202 tracks modification of data sectors to provide increased granularity. One example of a data track is shown and described in more detail with reference to FIG. 3. In further embodiments, the tracking module 202 may track only the most recent data modification or may track two or more data modifications.

In one embodiment, the error analysis module 204 determines a source of a data failure, if any. The source of a data failure may be a host adapter 118, a disk adapter 138, a communication fabric, a microprocessor 126, or another component within the data communication system 100.

In one embodiment, the array module 206 creates, or allocates, a tracking array for a granular portion of a track. The tracking array may correspond to the entire track, a segment, a sector, or another portion of the track. The array module 206 additionally may create a tracking array for every portion of every track on a disk corresponding to a LUN 130. One example of a tracking array is shown and described in more detail with reference to FIG. 5.

In another embodiment, the array module 206 may append a tracking array to a control block for a given LUN 130, disk, track, or portion of a track. For example, the array module 206 may append a tracking array to a cache directory control block (CDCB). In another embodiment, the array module 206 may append a tracking array to a non-volatile storage control block (NVSCB). Alternatively, the array module 206 may store the tracking array in another location or format within a cache, a non-volatile memory, or another data storage device.

In one embodiment, the initialization module 208 initializes a tracking array to an initialization instance. The initialization instance may be a valid instance type or an invalid instance type. For example, the initialization module 208 may initialize the tracking array to 0xFF, which may be an invalid instance type defining all cells to be invalid until a stage or write operation occurs.

In one embodiment, the failover module 210 fails over from a failed system component to another system component in response to recognition of a failure. In one embodiment, the failover module 210 may fail over from one system component to another in response to a determination by the error analysis module 204 that a failure has occurred. The failover module 210 may fail over from one adapter to another, from one communication fabric to another, from one storage server to another, or at another level within the data communication system 100.

In one embodiment, the notification module 212 notifies a user or system administrator of a failure within the data communication system 100. Additionally, the notification module 212 may notify a user or system administrator of a failover event and/or failover device.

Figure 3:
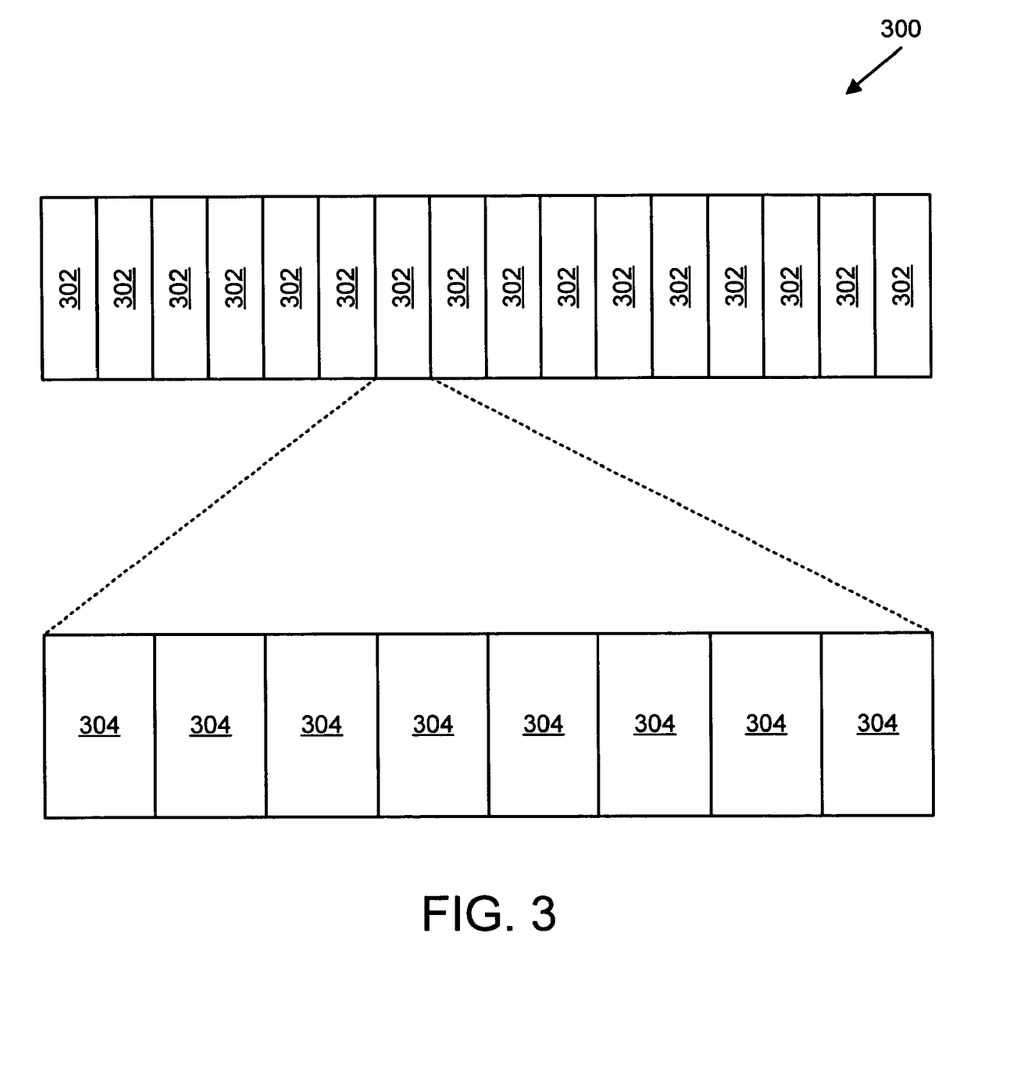
FIG. 3 is a schematic block diagram illustrating one embodiment of a data storage track.

FIG. 3 depicts one embodiment of a data storage track 300. The illustrated data storage track is representative of a track on a magnetic disk (not shown) or similar data storage device. Although certain embodiments are described with reference to a magnetic disk, other types of data storage devices may be used in place of or in conjunction with magnetic disks.

The illustrated data storage track 300 includes sixteen data segments 302. The data segments 302 may have substantially equal data storage capacities. For example, in one embodiment, each data segment 302 may store approximately four kilobytes (4 kB) of data. Alternatively, each data segment 302 may have a distinct data storage capacity that may be greater than or less than approximately four kilobytes.

Each data segment 302, in turn, may be divided into separate data sectors 304. In one embodiment, the data sectors 304 may have substantially equal data storage capacities. For example, each data sector 304 may store approximately 512 bytes of data for a data segment 302 of four kilobytes. Alternatively, each data sector 304 may store approximately 524 bytes of data. In another embodiment, each data sector 304 may have a distinct data storage capacity that may be greater than or less than approximately 512 bytes.

The granularity of the data storage segments 302 and sectors 304 allows tracking of data updates at various levels. In one embodiment, the tracking module 202 may track data modification of tracks 300, segments 302, sectors 304, or other subdivisions of a track 300.

Figure 4:
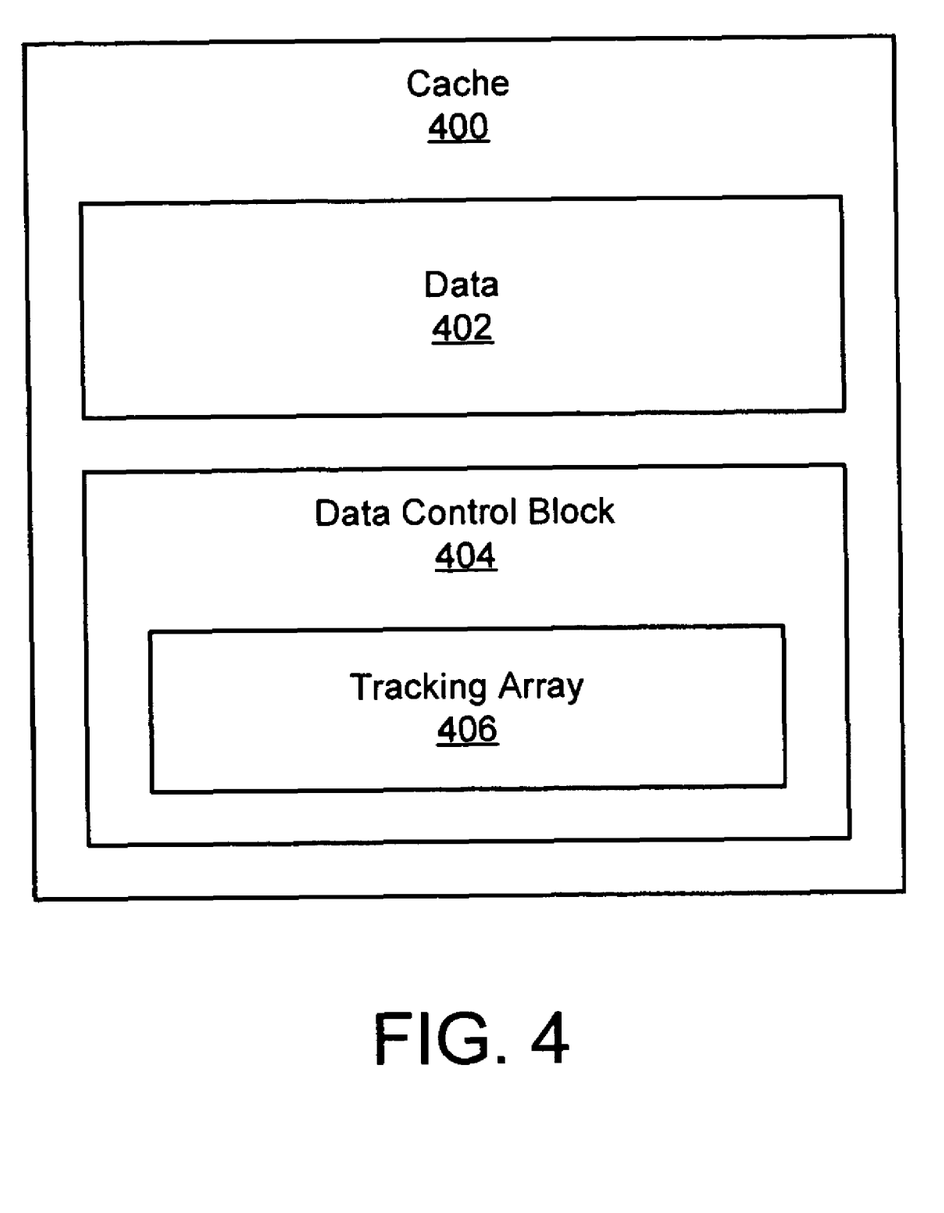
FIG. 4 is a schematic block diagram illustrating one embodiment of an electronic cache.

FIG. 4 depicts one embodiment of an electronic cache 400 that is substantially similar to the electronic cache 127 shown in FIG. 1. The illustrated cache 400 stores data 402 and a data control block 404. In one embodiment, the data control block 404 is associated with the data 402 concurrently stored on the cache 400. In another embodiment, the cache 400 may maintain one or more data control blocks 404 that correspond to data not stored on the cache 400. For example, the cache 400 may store a data control block 404 that corresponds to data that at one time was stored on the cache 400 but has been destaged from the cache 400 and stored to a LUN 130.

The illustrated data control block 404 includes a tracking array 406. As described above, the array module 206 may append a tracking array 406 to a data control block 404. One example of the tracking array 406 is shown and described in more detail with reference to FIG. 5.

Figure 5:
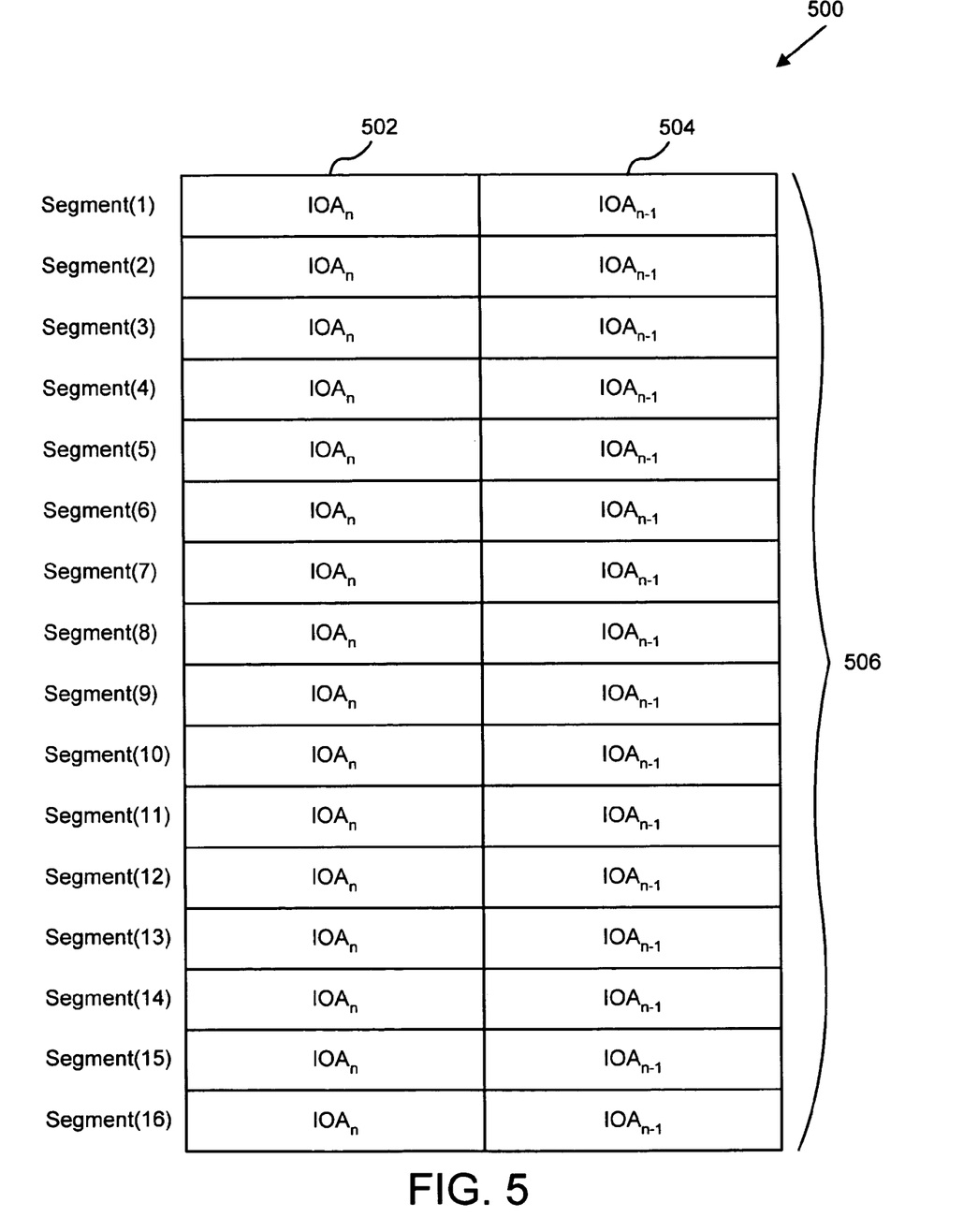
FIG. 5 is a schematic block diagram illustrating one embodiment of a tracking array.

FIG. 5 depicts one embodiment of a tracking array 500 that is substantially similar to the tracking array 406 shown in FIG. 4. The illustrated tracking array 500 includes a first adapter identifier field 502 and a second adapter identifier field 504 for each of sixteen segments 302 of a given track 300. Therefore, each row 506 of the tracking array 500 corresponds to one of the segments 302 (as identified to the left of the tracking array 500).

In one embodiment, the first adapter identifier field 502 stores an adapter identifier ($IOA_n$) associated with the most recent data modification of the corresponding segment 302. Similarly, the second adapter identifier field 504 stores an adapter identifier ($IOA_{n-1}$) associated with the next most recent data modification of the corresponding segment 302. For example, the first adapter identifier field 502 for segment (1) stores the adapter identifier ($IOA_n$) for the source adapter that most recently modified segment(1). Similarly, the second adapter identifier field 504 for segment(1) stores the adapter identifier ($IOA_{n-1}$) for the source adapter that previously modified the data in segment(1).

The size of the tracking array 500 may depend on the size of the adapter identifiers, the number of segments 302 (or other granular portions), the amount of historical data preserved, and so forth. In one embodiment, where a track 300 is divided into sixteen segments 302, the tracking array 500 may include sixteen rows 506, one for each segment 302. Furthermore, where the two most recent adapter identifiers are maintained, the tracking array 500 may include two adapter identifier fields 502, 504 for each segment 302, as described above. Therefore, in one embodiment, the tracking array 500 may be a 16×2 byte array (32 bytes total) where each adapter identifier may be identified by a single byte. For example, an adapter identifier may be identified by a single byte where the adapter identifier corresponds to the physical location of the adapter. In some embodiments, the type of an adapter may be determined by the physical location of the adapter as indicated by the adapter identifier. Alternatively, the tracking array 500 may be a 16×4 byte array (64 bytes total) where each adapter identifier is identified by two bytes.

As described above, the tracking module 202 may move adapter identifiers within the tracking array 500 in anticipation of storing a more recent adapter identifier in the tracking array 500. For example, the tracking module 202 may copy an adapter identifier corresponding to an adapter associated with a past data modification from the first adapter identifier field 502 to the second adapter identifier field 504 (e.g., from $IOA_n$ to $IOA_{n-1}$). The tracking module 202 subsequently may store an adapter identifier associated with a more recent data modification in the first adapter identifier field 502 (e.g., $IOA_n$). In this way, the adapter identifier associated with the most recent data modification is stored in the first adapter identifier field 502 and the adapter identifier associated with the next most recent data modification is stored in the second adapter identifier field 504.

Figure 6:
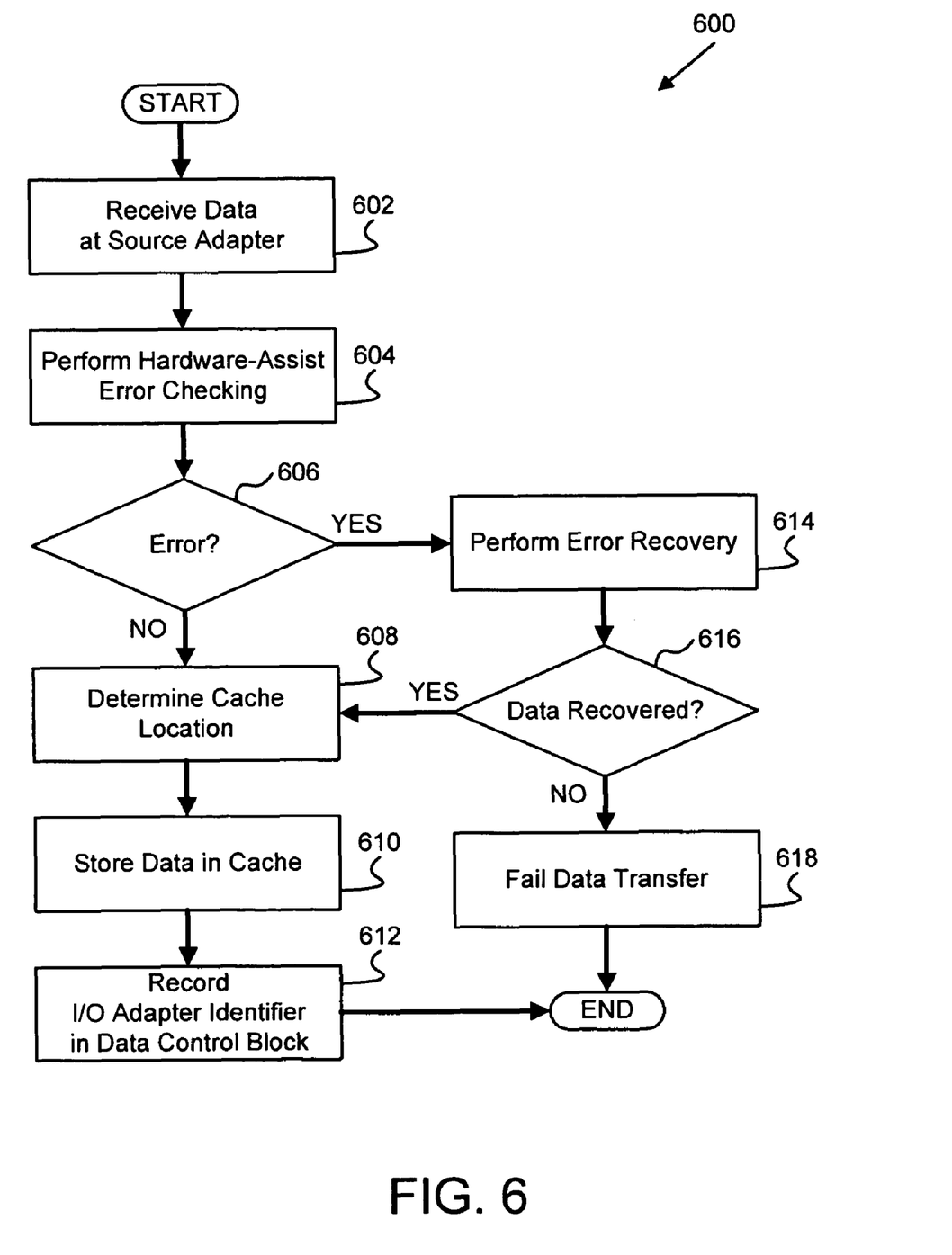
FIG. 6 is a schematic flow chart diagram illustrating one embodiment of a source adapter method.

FIG. 6 depicts one embodiment of a source adapter method 600. The illustrated source adapter method 600 represents some of the operations that may be performed in conjunction with processing a data modification request at a source adapter, such as a host adapter 118. The illustrated source adapter method 600 begins and the source adapter receives 602 data 402 at the source adapter. The source adapter then may perform hardware-assisted error checking 604 to verify the integrity of the received data 402. Alternatively, the source adapter may perform another type of error checking or may forgo error checking at the source adapter. For example, the source adapter may implement error checking algorithms through software at the source adapter.

If error checking is performed, the source adapter determines 606 if an error exists in the received data 402. If there are no errors in the received data 402, the source adapter determines 608 a cache location and stores 610 the data 402 in the cache 402. The source adapter also records its adapter identifier in the corresponding data control block 404 that is associated with the data 402. For example, the source adapter may store its adapter identifier in the tracking array 500 in a field corresponding to the most recent data modification of the destination segment 302.

Alternatively, if the received data 402 contains transmission errors, the source adapter performs error recovery 614 at the source adapter. The source adapter then determines 616 if the data 402 is successfully recovered and, if so, proceeds to determine 608 a cache location as described above. Otherwise, if the data 402 is not recovered, the source adapter may fail 618 the data transfer operation. For example, the source adapter may notify the requesting host 102 that the data transfer was not successful. After the data transfer fails, or after the data 402 is successfully stored in the cache 400 and the adapter identifier is recorded in the tracking array 500, the depicted source adapter method 600 then ends.

Figure 7:
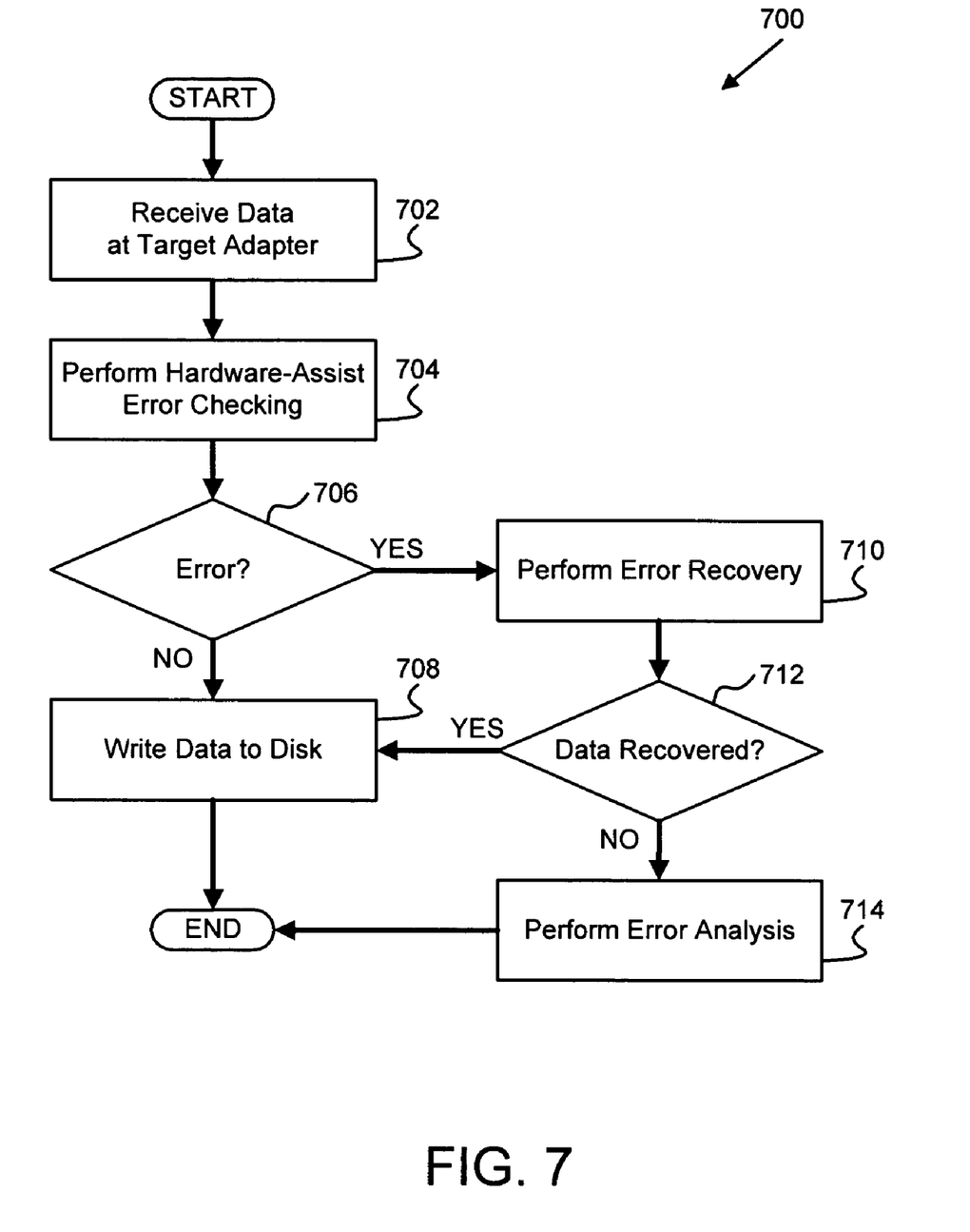
FIG. 7 is a schematic flow chart diagram illustrating one embodiment of a target adapter method.

FIG. 7 depicts one embodiment of a target adapter method 700. The illustrated target adapter method 700 represents some of the operations that may be performed in conjunction with processing a data modification request at a target adapter, such as a device adapter 138, as the data 402 is destaged from the cache 400. The illustrated target adapter method 700 begins and the target adapter receives 702 the data 402 at the target adapter. The target adapter then may perform hardware-assisted error checking 704 to verify the integrity of the received data 402. Alternatively, the target adapter may perform another type of error checking or may forgo error checking at the target adapter. For example, the target adapter may implement error checking algorithms through software at the target adapter.

If error checking is performed, the target adapter determines 706 if an error exists in the received data 402. If there are no errors in the received data 402, the target adapter writes 708 the data to a LUN 130, for example. Alternatively, the target adapter method 700 may be modified to apply to data transfer operation in which the data is transferred from a LUN 130 to a host 102.

Alternatively, if the received data 402 contains transmission errors, the target adapter performs error recovery 710 at the target adapter. The target adapter then determines 712 if the data 402 is successfully recovered and, if so, proceeds to write 708 the data 402 to disk, as described above. Otherwise, if the data 402 is not recovered, the target adapter may invoke the tracking apparatus 200 to perform error analysis 714 to determine the source of the failure. One example of the error analysis operation 714 is described in more detail with reference to FIG. 8. After performing error analysis 714 or writing 708 the data 402 to disk, the depicted target adapter method 700 then ends.

Figure 8:
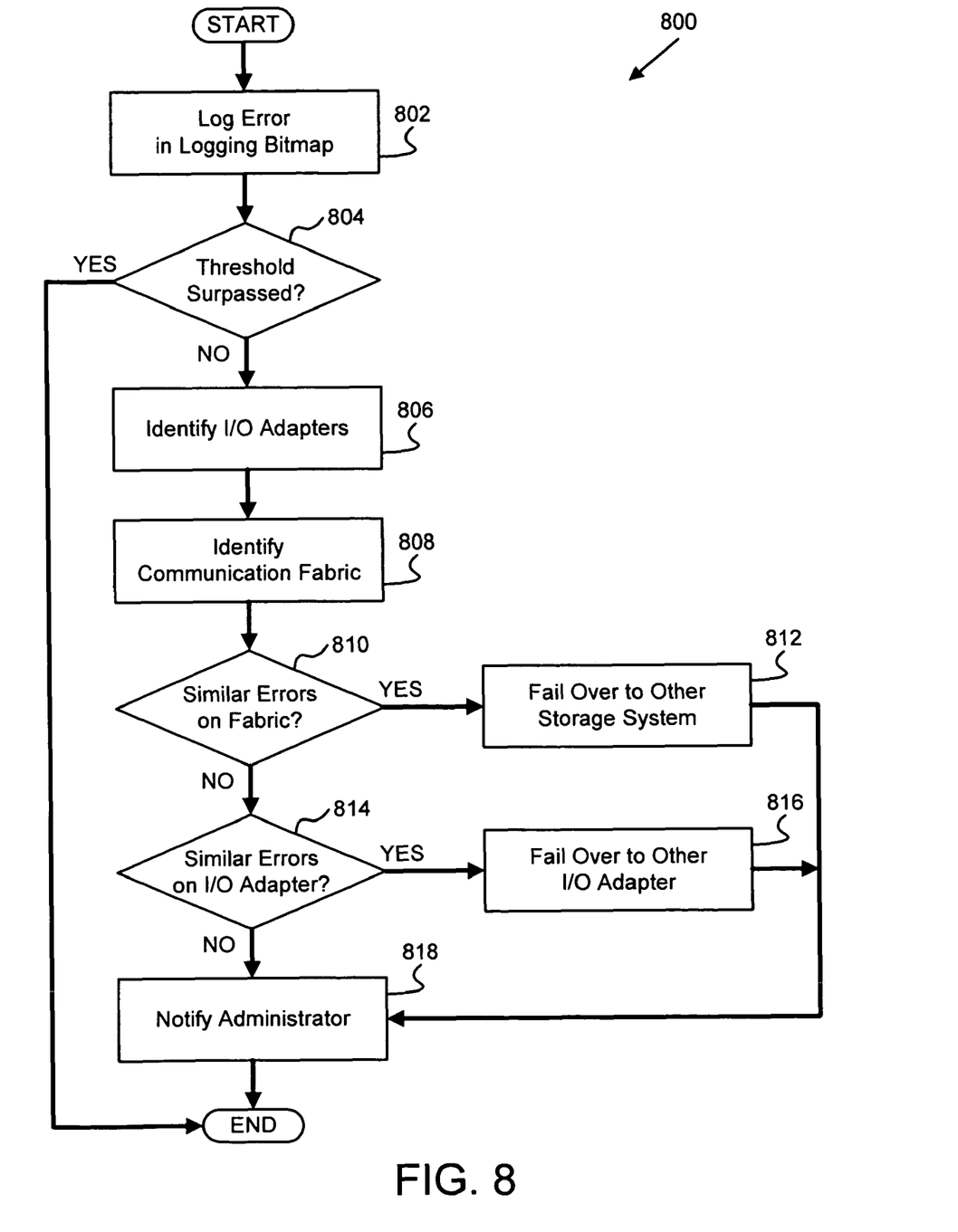
FIG. 8 is a schematic flow chart diagram illustrating one embodiment of an error analysis method.

FIG. 8 depicts one embodiment of an error analysis method 800 that is given by way of example of the error analysis operation 714 of the target adapter method 700 of FIG. 7. The illustrated error analysis method 800 may be implemented, at least in part, by the tracking apparatus 200 described with reference to FIG. 2. The illustrated error analysis method 800 begins and logs 802 the detected error in a logging bitmap or other type of error log. In one embodiment, the error analysis module 204 logs 802 the detected error.

The tracking apparatus 200 then determines 804 if an error threshold is surpassed and, if so, proceeds to identify 806 the I/O adapters associated with the data 402. In one embodiment, the tracking apparatus 200 identifies 806 the associated adapters from the tracking array 500. The tracking apparatus 200 also may identify 808 any communication fabrics corresponding to the associated adapters.

The tracking apparatus 200 then determines 810 if the communication fabric is potentially defective, thereby causing the data errors. In one embodiment, the tracking apparatus 200 may invoke the error analysis module 204 to determine 810 if the communication fabric is faulty. If the communication fabric is determined 810 to be defective, the failover module 210 may proceed to fail over 812 to another storage system 100. Alternatively, the failover module 210 may fail over 812 to another communication fabric or cluster 122, 124.

Alternatively, if the communication fabric is not the source of the data errors, the tracking apparatus 200 then determines 814 if a source adapter is potentially defective, thereby causing the data errors. In one embodiment, the tracking apparatus 200 may invoke the error analysis module 204 to determine 814 if a source adapter is faulty. If the source adapter is determined 814 to be defective, the failover module 210 may proceed to fail over 816 to another adapter. Alternatively, the failover module 210 may fail over 816 to another communication fabric or cluster 122, 124.

After failing over 812, 816 to another system component, or after determining 814 that neither the communication fabric nor the source adapter are defective, the notification module 212 may notify 818 a user or system administrator of the error analysis proceedings. Subsequently, the depicted error analysis method 800 ends.

The schematic flow chart diagrams included herein are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to facilitate failure management, the apparatus comprising:
    a tracking module configured to store an adapter identifier in a tracking array, the tracking array tracking data received from one or more source adapters, the adapter identifier corresponding to a source adapter from which the received data originated, the adapter identifier associating the received data to the corresponding source adapter, the tracking array comprising a first adapter identifier field configured to store the adapter identifier and comprising a second adapter identifier field configured to store a second adapter identifier corresponding to a second source adapter from which data was received prior to the received data;
    the tracking module further configured to move the adapter identifier from the first adapter identifier field to the second adapter identifier field in anticipation of storage of an additional adapter identifier in the first adapter identifier field; and
    an error analysis module coupled to the tracking module, the error analysis module configured to determine a source of a data failure in response to recognition of the data failure, the error analysis module determining the source of a data failure based on an identified source identifier in the tracking array, wherein the identified source identifier corresponds to a source adapter from which the data failure originated,
    wherein all or a portion of the tracking module and the error analysis comprise one or more of logic hardware and executable code, the executable code stored on one or more non-transitory computer readable storage media.

2. The apparatus of claim 1, further comprising an array module coupled to the tracking module, the array module configured to create a plurality of tracking arrays, including the tracking array, each of the plurality of tracking arrays corresponding to one of a plurality of electronic data storage devices.

3. The apparatus of claim 2, wherein the array module is further configured to append the tracking array to a data control block corresponding to one of the plurality of electronic data storage devices.

4. The apparatus of claim 2, further comprising an initialization module coupled to the array module, the initialization module configured to initialize each of the plurality of tracking arrays upon creation to an initialization instance.

5. The apparatus of claim 1, further comprising a failover module coupled to the error analysis module, the failover module configured to fail over to a failover storage system in response to recognition of a failed communication fabric.

6. The apparatus of claim 1, further comprising a failover module coupled to the error analysis module, the failover module configured to fail over to a failover adapter in response to recognition of a failure at the source adapter.

7. The apparatus of claim 1, further comprising a notification module coupled to the error analysis module, the notification module configured to notify a system administrator of a system failure in response to recognition of the system failure.

8. The apparatus of claim 1, wherein the error analysis module is further configured to determine if the source adapter is the source of the data failure.

9. The apparatus of claim 1, wherein the error analysis module is further configured to determine if an adapter other than the source adapter is the source of the data failure.

10. The apparatus of claim 1, wherein the error analysis module is further configured to determine if a communication fabric is the source of the data failure.

11. A system to facilitate failure management, the system comprising:
    one or more data communication adapters;
    a multi-processor coupled to the one or more data communication adapters, the multi-processor configured to receive data and metadata from the one or more data communication adapters, the metadata inclusive of an adapter identifier corresponding to the one or more data communication adapters;
    a cache coupled to the multi-processor; and
    a tracking apparatus coupled to the multi-processor, the tracking apparatus comprising,
        a tracking module configured to store the adapter identifier in a tracking array appended to a data control block stored in the cache, the tracking array tracking data received from one or more source adapters, the adapter identifier corresponding to a source adapter from which the received data originated, the adapter identifier associating the received data to the corresponding source adapter, the tracking array comprising a first adapter identifier field configured to store the adapter identifier and comprising a second adapter identifier field configured to store a second adapter identifier corresponding to a second source adapter from which data was received prior to the received data;
        the tracking module further configured to move the adapter identifier from the first adapter identifier field to the second adapter identifier field in anticipation of storage of an additional adapter identifier in the first adapter identifier field; and
        an error analysis module coupled to the tracking module, the error analysis module configured to determine a source of a data failure in response to recognition of the data failure, the error analysis module determining the source of a data failure based on an identified source identifier in the tracking array, wherein the identified source identifier corresponds to a source adapter from which the data failure originated.

12. The system of claim 11, wherein the tracking apparatus is further configured to determine a source of a data failure in response to recognition of the data failure.

13. The system of claim 11, wherein the data communication adapter comprises one of a host adapter and a disk adapter.

14. A non-transitory computer readable storage medium tangibly embodying a program of machine-readable instructions executable by a digital processing apparatus to perform operations to facilitate failure management, the operations comprising:

storing one or more adapter identifiers in a tracking array, the tracking array tracking data received from a source adapter, the one or more adapter identifiers corresponding to the source adapter from which portions of the received data originated, the adapter identifier associating the received data to the corresponding source adapter, the tracking array comprising a first adapter identifier field configured to store the adapter identifier, the tracking array comprising a second adapter identifier field configured to store a second adapter identifier corresponding to a second source adapter from which data was received prior to the received data;

moving the adapter identifier from the first adapter identifier field to the second adapter identifier field in anticipation of storage of an additional adapter identifier in the first adapter identifier field; and determining a source of a data failure in response to recognition of the data failure based on an identified source identifier in the tracking array, wherein the identified source identifier corresponds to a source adapter from which the data failure originated.

15. The computer readable storage medium of claim 14, wherein the instructions further comprise an operation to create a plurality of tracking arrays, including the tracking array, each of the plurality of tracking arrays corresponding to one of a plurality of electronic data storage devices.

16. The computer readable storage medium of claim 15, wherein the instructions further comprise an operation to initialize each of the plurality of tracking arrays upon creation to an initialization instance.

17. The computer readable storage medium of claim 14, wherein the instructions further comprise an operation to fail over to a failover device in response to recognition of a system device failure.

18. The computer readable storage medium of claim 14, wherein the instructions further comprise an operation to notify a system administrator of a system failure in response to recognition of the system failure.

* * * * *